United States Patent [19]

Hamill, III

[11] 4,307,506

[45] Dec. 29, 1981

[54] TOOL CHANGER FOR A MACHINE TOOL

[75] Inventor: Samuel M. Hamill, III, Scituate, Mass.

[73] Assignee: Hamill Company, Inc., Pembroke, Mass.

[21] Appl. No.: 185,342

[22] Filed: Sep. 8, 1980

[51] Int. Cl.³ .......................................... B23Q 3/157
[52] U.S. Cl. ...................................... 29/568; 29/26 A
[58] Field of Search ................................ 29/568, 26 A

[56] References Cited

U.S. PATENT DOCUMENTS 3,678,572  7/1972  Mello et al. ........................... 29/568

FOREIGN PATENT DOCUMENTS 2239774  2/1974  Fed. Rep. of Germany ........ 29/568
1316051  5/1973  United Kingdom .................. 29/568

OTHER PUBLICATIONS

Fadal Equipment Corporation, "Automatic Tool Changer".
Moog, Inc., "Numerical Control".
Cincinnati Milacron, "CIM-XCHANGER 720 Buyers Guide".
Kitamura Machinery Co., Ltd. "Vertical Type T-20 Machining Center".
Autonumerics, Inc., "Positool Machining Center".
Boston Digital, Advertisement from "Modern Machine Shop", Feb. 1980.

Primary Examiner—Z. R. Bilinsky
Attorney, Agent, or Firm—Kenway & Jenney

[57] ABSTRACT

Apparatus for changing tools for a machine tool which selectively moves a tool along a Z axis with respect to a workpiece support table. The machine tool has a fixed position tool magazine which supports a tool having its principle axis parallel to a magazine axis. A tool carriage and associated tool gripper are selectively operable to move a tool between the tool magazine and the tool holder of the machine tool. A mechanical linkage maintains the tool axis to be parallel to the Z axis when the carriage is adjacent to the tool holder, and to be parallel to the magazine axis when the carriage is adjacent to the magazine.

9 Claims, 5 Drawing Figures

TOOL CHANGER FOR A MACHINE TOOL

BACKGROUND OF THE DISCLOSURE

This invention is in the field of machine tools, and more particularly, to automatic tool changers for use with milling machines.

Conventional milling machines generally include a workpiece support table which may be selectively translated along first (X) and second (Y) axes in a plane, and a cutting element which is rotated about and selectively translated along a third (Z) axis. Typically, a base member supports a saddle adapted for translational motion along the X axis. The saddle in turn supports a workpiece table adapted for translational motion with coupled to the saddle along the Y axis. A column is to the base and supports a head which may be selectively driven in a direction parallel to the Z axis. The head generally includes a spindle and associated drive which is adapted for holding a cutting element, or tool, and rotating that tool about the Z axis at a predetermined angular velocity. In alternate forms, the workpiece support table may be rotatable about an axis parallel to the Z axis.

It is well known to provide a computer-based controller for such a milling machine to permit a sequence of programmed motions of the workpiece table and spindle to accomplish a desired machining operation. There are many occasions when it is desired to provide a succession of such machining operations which may require a different tool to be driven by the spindle during each operation. To accomplish this, automatic tool changers have been developed in the prior art. Such tool changer devices are typically driven by the same computer-based controller which drives the spindle and workpiece table. In general, such devices require a tool magazine which supports a plurality of tools in an associated plurality of carriers arranged in a ring. The carriers in the ring may be selectively indexed by the controller so that a desired tool carrier may be positioned at a tool pick-up location. To load a tool from the pick-up location to the tool-holding element of the spindle, a tool selector is selectively operable by the controller to initially move to the tool pick-up location, grab the tool from its carrier at that location, and then move the tool to the tool-holding element and insert the tool in the tool-holding element. The tool selector is then moved to a position out of the way of the machining operation. To effect a tool change, the controller controls the tool selector to perform the reverse sequence to remove the tool from the spindle and re-insert it in its carrier. After the tool selector is moved out of the way of the magazine, the magazine is then indexed to advance the tool required for the next machining operation to the pick-up location. That tool is then grabbed and inserted into the spindle, as described above. In some prior art systems, the tool selector is "two headed" (i.e. it includes two "grippers", each of which can hold a tool) so that a tool changing operation may be performed in the following sequence. First, the selector selects the new tool from the magazine, placing the selected tool in one of its grippers. Then, the selector travels to the tool holder of the spindle, and first extracts the old tool, placing that tool in the selector's vacant gripper. Then, the selector inserts the new tool in the tool holder, and finally returns the old tool to the magazine. With this configuration, the tool selector only requires a single trip between the magazine and spindle to accomplish a tool change.

In the prior art, the machines are generally arranged so that before each tool changing operation, the head retracts to its fully retracted position along the Z axis and then the tool selector which is coupled at a fixed height to the column then performs its tool changing operation. While this approach is generally efficient in relatively small machines where the quill travel for the head is relatively short, in larger machines which have correspondingly larger quill travel, the requirement for positioning the head to its fully retracted position before changing is both time-consuming and requires relatively large amounts of energy.

In a number of other prior art systems, the full Z-direction retraction step for the head is avoided by mechanically mounting the tool magazine on the head itself. With this configuration, the tool changing operation may be performed with the head minimally retracted from the workpiece, rather than at its fully retracted position. While this approach does eliminate the problems faced by relatively small machines, in that full retraction is not required, the requirement for the head to carry the full magazine in all its motions tends to load the head (requiring larger drive motors and associated mechanizations) since the full magazine must be carried everywhere the head moves. In some machines, this loading is minimized by providing magazines with a relatively small number of tools, although such configurations reduce the versatility of the resultant system.

Accordingly, it is an object of the present invention to provide an improved automatic tool changer for a machine tool.

It is another object to provide an automatic tool changer for a machine tool which permits automatic interchange of tools from a fixed position tool magazine to a spindle at any point along the head travel.

SUMMARY OF THE INVENTION

Briefly, the present invention is an apparatus for changing tools for a machine tool which includes a workpiece support table and a device for moving a tool along a reference Z-axis relative to the positioning table. The apparatus includes a tool magazine at a fixed position along the Z-axis. The tool magazine houses a plurality of tools, and includes a tool loading station which maintains a tool at that station with its principle axis parallel to a magazine axis. A tool carriage includes a gripper which is selectively operable to grip a tool with its principal axis parallel to a gripper axis. A mechanical linkage is adapted for selectively translating the tool carriage between the tool loading station and the tool moving device, or head. When the carriage is adjacent to the head, the linkage maintains the gripper axis substantially parallel to the Z-axis. When the tool carriage is adjacent to the tool loading station, the linkage maintains the gripper axis parallel to the magazine axis at the tool loading station. In some forms, the tool carriage is further adapted to selectively rotate the gripper about the gripper axis, so that the gripper may initially grip the tool being held by the machine tool, reposition that tool by translating it along the gripper axis, and then rotating the gripper with the tool 180 degrees to remove the tool from the machine.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
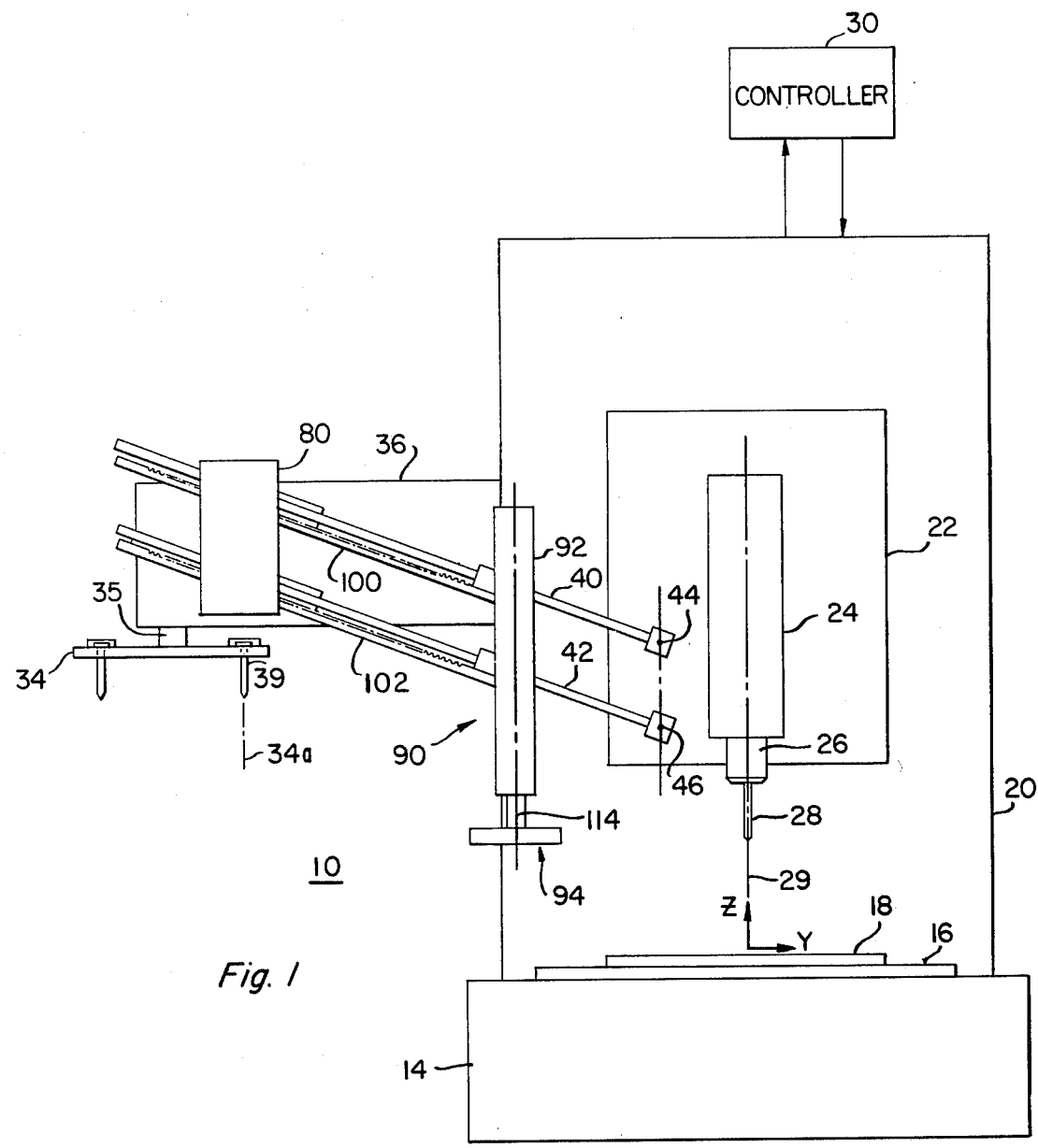
FIG. 1 shows a preferred embodiment of the present invention.

FIG. 1 illustrates an exemplary embodiment of the present invention. In FIG. 1, a vertical milling machine 10 is shown including a base 14 having a saddle 16 which is selectively movable in a first (X) direction (out of the paper in FIG. 1) and a workpiece positioning table 18 which is selectively movable (by way of conventional drive assemblies, not shown) in a second (Y) direction. A column 20 is coupled to the base member 14 and supports a head 22 which is selectively movable (by way of conventional drive assemblies, not shown) in a direction parallel to a third (Z) axis. The head 22 includes a spindle 24 and an associated tool holder 26. The tool holder 26 is adapted to support a cutting element (or tool) 28 along an axis 29 which is coaxial with the Z axis. The spindle 24 is adapted to rotationally drive (by conventional means, not shown) the cutting element 28 about the Z axis. A controller 30 is coupled to the milling machine. The controller 30 provides appropriate driving signals to the various drive assemblies (not shown) for programmably driving the workpiece positioning table and the spindle so that the tool 28 performs a desired sequence of machining operations in a conventional fashion.

Figure 5:
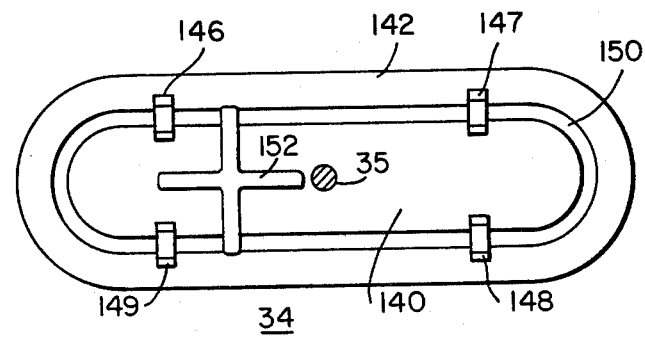
FIG. 5 shows, in detailed form, the exemplary tool magazine of the embodiment of FIG. 1.

The machine 10 also includes a tool magazine 34 and as associated support member 36 which is adapted to maintain the magazine 34 at a fixed height relative to the workpiece positioning table 18. Magazine 34, described below in conjunction with FIG. 5, is connected to member 36 by support bar 35, and holds one or more cutting elements, or tools, for use in the tool holder 26. Two such cutting elements 38 and 39 are shown in FIG. 1 with cutting element 39 being positioned at a tool loading station.

Figure 2:
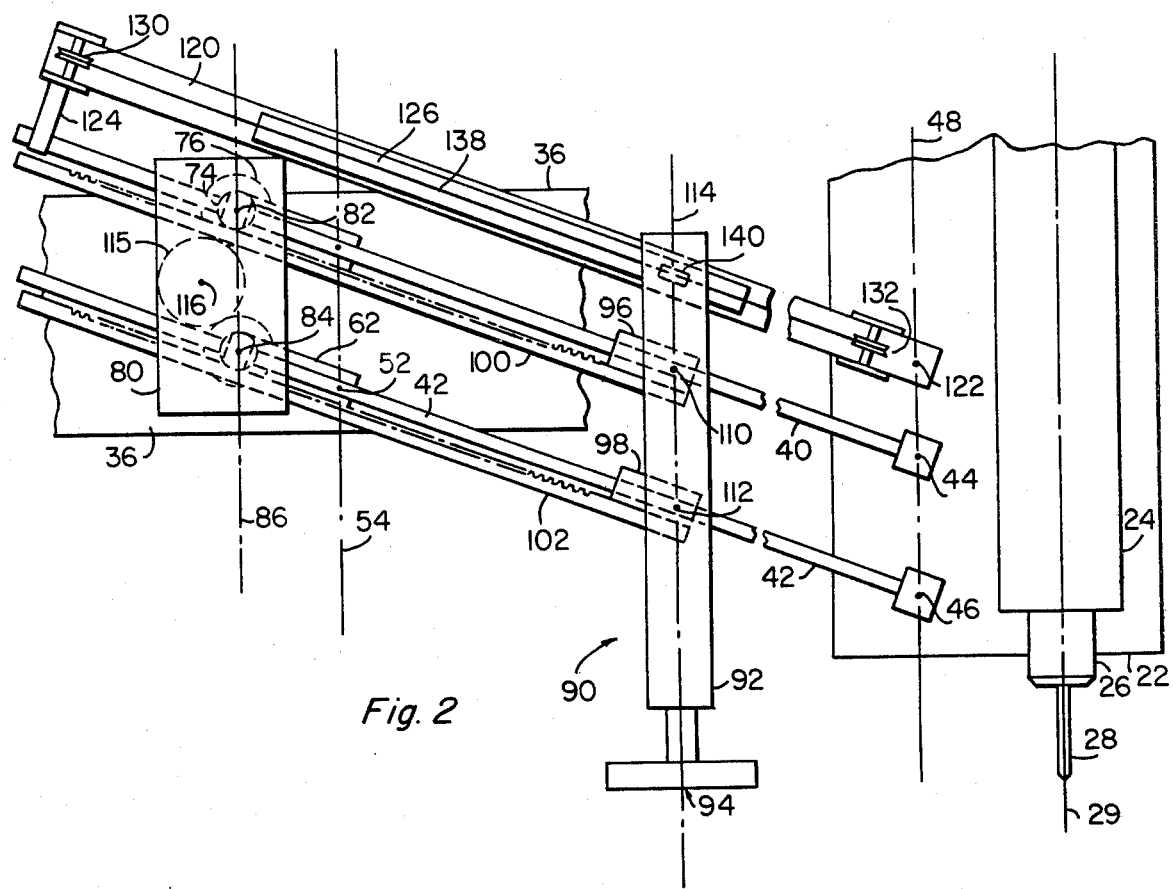
FIG. 2 shows, in detailed form, the tool changing apparatus of the embodiment of FIG. 1.

The machine 10 further incudes a tool changing apparatus, which is shown generally in FIG. 1. The tool changing apparatus is shown in detailed form in FIG. 2.

The tool changing apparatus includes bars 40 and 42 which are pivotally coupled to the head 22 about axes at points 44 and 46, respectively. Points 44 and 46 are aligned along an axis 48 which is parallel to the axis 29. The bars 40 and 42 are constrained to be limited to pivotal motion about pivot points 50 and 52, respectively. Points 50 and 52 are fixed with respect to the support member 36 and lie along an axis 54, which is parallel to axis 29. Further, the points 50 and 52 are separated by the same distance along axis 54 as the pivot points 44 and 46 are along axis 48.

Figure 3:
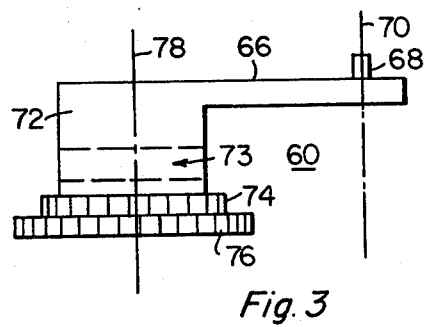
FIGS. 3 and 4 show, in detailed form, couplers in the embodiment of FIGS. 1 and 2.

In the illustrated embodiment, this apparatus for constraining the motion of bars 40 and 42 is provided by identical guide members 60 and 62, respectively. The guide member 60 is shown in detailed form in FIG. 3, and includes a base portion 66 which includes a pivotal coupling 68 for coupling that base member 66 for pivotal motion about an axis 70 which passes through point 50 of support member 36. The guide member 60 further includes a bar guide portion 72 at the end of base member 66 opposite to the coupling 68. The bar guide portion 72 includes a channel 73 (indicated by the broken lines in FIG. 3) having a central axis perpendicular to and passing through axis 70. Channel 73 constrains the motion of bar 40 to sliding motion along the central axis of that guide channel 73. Guide member 60 further includes gears 74 and 76 which are connected together and adapted for rotation with respect to base portion 66 about an axis 78. The guide member 60 is further pivotally coupled to a guide housing 80 to permit pivotal motion of the guide member 60 with respect to the housing 80 about axis 78 at point 82. Guide member 62 is identically configured, with guide member 62 being pivotally coupled to housing 80 at point 84. The points 82 and 84 are constrained to lie along an axis 86 which is parallel to axis 29, with the points 80 and 84 being separated by the same distance along axis 86 as the points 44 and 46 are along axis 48. With this configuration, as the head 22 moves with respect to the support member 36, the bars 40 and 42 are constrained to be parallel, regardless of the relative position of the movable head 22 with respect to support member 36.

Figure 4:
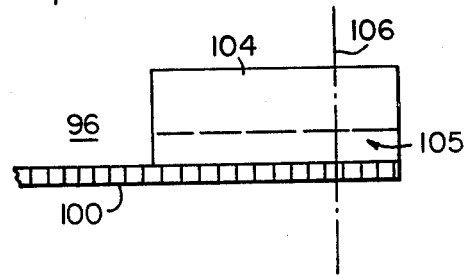

The tool changing apparatus further includes a tool carriage assembly 90. In the illustrated embodiment, the carriage assembly 90 includes a body member 92 and a gripper assembly 94, identical guide members 96 and 98 and racks 100 and 102. Guide member 96 is shown in detailed form in FIG. 4, and includes a body portion 104. The body portion 104 of member 96 is pivotally coupled to body member 92 at point 110 adapted for pivotal motion so that member 96 is pivotable with respect to body member 92 about an axis 106. Body portion 104 has a central channel 105 (indicated by the broken lines in FIG. 4) having a central axis perpendicular to and passing through axis 106. Channel 105 permits guide member 96 to slide along bar 40. Guide member 96 further includes an elongated rack 100 coupled thereto so that rack 100 is substantially parallel to the bar 40. Rack 100 has its gear teeth on its upper (as illustrated) surface. The guide member 98 is similarly coupled to the body member 92 in a manner permitting pivotal motion of the guide member 98 about a pivot axis at point 112. The points 110 and 112 of body member 92 lie along an axis 114 and are separated along that axis 114 by substantially the same distance as points 44 and 46 are along an axis 48.

Near the end of rack 100 furthest from body portion 104, the gear teeth of that rack are coupled to the gear 74 so that translational motion of the rack 100 is converted to rotational motion of the coupled gear 74. The rack 102 is similarly coupled to the corresponding gear of guide member 62. A gear 115 is pivotally coupled about housing 80 about a point 116 so that the teeth of gear 115 engage the teeth of gear 76 of guide member 60 and the teeth of the corresponding gear of guide member 62. With this configuration, the axis 114 of the tool changing assembly 90 is maintained substantially parallel to the axis 29 regardless of the relative position of head 22 with respect to the support member 36. Accordingly, in the presently described embodiment, where the magazine axis 34a is parallel to Z axis 29, the gripper axis is maintained parallel to both of these axes throughout the full range of motion of carriage assembly 90. In alternate embodiments, the gripper axis may be angularly offset from either or both of axes 39a and 29 except when carriage assembly 90 is adjacent to one of those axes.

The tool gripper 94 includes a pair of conventional scissors-like assemblies, each of which may be selectively operative to close against a tool positioned between the opposing elements of the respective gripper. The carriage assembly 90 is also adapted so that the gripper 94 may be selectively translated with respect to body member 92 along and rotated about axis 114. By way of example, the gripper 94, when positioned so that one pair of its opposing elements is positioned on either side of tool 28, may be driven so that those elements are closed against tool 28 and the gripper assembly 94 can be lowered with respect to the body member 92 to remove the tool from the tool holder 26. Then, the gripper 94 can be rotated 180 degrees about axis 114 and raised with respect to body member 92 so that a new tool, already positioned in the other pair of opposed elements of gripper 94, may be aligned to be coaxial with axis 29 and then inserted into a holder 26. A similar operation tool exchange may occur at the tool magazine 34 at a tool loading and unloading station of magazine 34.

In alternate embodiments, the tool magazine may be pivotable about an axis parallel to axis 29. In such embodiments, the tool exchange at the magazine does not require the gripper to move along the axis 114. Instead, the magazine pivots out of the way to the gripper while the gripper moves into an exchange position. Then, the magazine first pivots back to grab the tool from the gripper, and then pivots out of the way so that a new tool can be advanced to the tool loading/unloading station of the magazine. Finally, the magazine pivots to place the new tool in the gripper, and finally pivots back out of the way so the carriage can return to the head.

In the present embodiment, the machine 10 further includes a drive assembly for the tool changing assembly 90. This drive assembly (shown in FIG. 2) includes a base member 120 which is pivotally coupled to the head 22 at a pivot point 122. The other end of the base member 120 is coupled to the other end of bar 40 by a support member 124 so that the base member 120 is substantially parallel to the bar member 40. The drive apparatus further includes a selectively controlled air cylinder 126 (controlled by controller 30) and a pulley and cable assembly including pulleys 130 and 132 (at opposite ends of base member 120) and a cable 138 (which extends from one end of the air cylinder 126 around pulley 130, to pulley 132, and back to the other end of air cylinder 126. A coupling member 140 is affixed to the cable 138 and in turn is coupled to the body member 92 of assembly 90.

With these configurations, the controller 30 may selectively control the coupling member 140 for the assembly 90 so that that assembly may be driven along the bars 40 and 42 between the head 22 and the support member 36. Alternately, a gear and associated driver may be coupled to the gear 115 for driving that gear to in turn drive the carriage 90.

By way of example, FIG. 5 shows exemplary form of the tool magazine 34. In that form, the tool magazine 34 includes an inner member 140 which is coupled by support bar 35 to the tool support member 36. An outer member 142 is coupled by support members 146–149 so that the portions 140 and 142 are positioned to establish a continuous channel 150. Channel 150 includes a plurality of tool carriers (not shown), each of which may support a tool. The tool magazine 34 and its tool carriers are adapted so that the tool at the loading station (i.e. at the location where the gripper may grip that tool) has its principle axis parallel to a magazine axis 34a. In the preferred embodiment, the magazine axis 34a is parallel to axis 29. In other embodiments, axis 34a may be angularly offset with respect to axis 29. A selectively driven member 152 may be selectively controlled by controller 130 to increment the endless chain of tool carriers about the channel 150 so that a desired tool carrier is positioned at a tool loading station. When a particular tool carrier is positioned at the tool loading station, the gripper 94 from the assembly 90 may selectively grab the tool affixed to that carrier. In alternative embodiments, the tool magazine 34 may be selectively movable along an axis perpendicular to axis 29.

In operation, assuming there is a tool 28 in place in the tool holder 26, the controller 30 may selectively initiate a tool changing operation, without requiring a particular fixed return point for the head 22. For example, with the head 22 in the position shown, the controller 30 may control air cylinder 26 to drive the tool changer assembly 90 to the tool loading station of the magazine 34. At that point, the tool gripper assembly 94 may select a new tool for insertion in the tool holder 26 by first controlling one pair of its opposing arms to close about the selected tool, and then translate away (along axis 114) from body member 92 to extract the tool from its carrier. The controller 30 then controls the assembly 90 to translate down bars 40 and 42 toward head 22. During this motion, the gripper 94 returns to its retracted position against body member 92. Upon reaching the ends of bars 40 and 42 adjacent to head 22, the other pair of opposing arms of the gripper 90 are positioned about the tool 28. The controller 30 may then cause those opposing arms to grab tool 28, and the assembly 94 may lower with respect to the body 92 in a manner removing the tool 28 from holder 26. With the tool holder 94 in its lower position, the gripper 94 rotates 180 degrees about axis 114 in a manner positioning the new tool to be coaxial with the axis 29. The assembly 94 then retracts back into body 92 inserting the new tool in the tool holder 26. The opposing arms of the gripper 94 for the new tool are released and then the tool changer assembly 90 is driven by the controller 30 to an intermediate position so that the next machining operation may be performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for changing tools for a machine tool, said tools having principle axes, and said machine tool including means for selectively moving one of said tools along a reference (Z) axis relative to a workpiece positioning table with said principle axis being parallel to said Z axis, comprising:

A. a tool magazine including tool carrier means for storing a plurality of said tools, said carrier including a tool loading station wherein one of said tools at said tool loading station has its principle axes substantially parallel to a magazine axis, said tool carrier means being positioned at a fixed position along said Z axis, B. a tool carriage including a gripper means and associated means for selectively translating said gripper means along a gripper axis, said gripper means being selectively operable to grip a tool adjacent thereto with its principle axis parallel to said gripper axis, C. linkage means including means for selectively translating said tool carriage between said tool loading station and said tool moving means whereby said gripper axis is substantially parallel to said Z axis when said tool carriage is adjacent to said tool moving means and whereby said gripper axis is substantially parallel to said magazine axis when said tool carriage is adjacent to said tool loading station, wherein said linkage means includes a variable perimeter parallelogram linkage having two pivot points pivotally coupled to said tool moving means and two pivot points pivotally coupled to said machine tool at a fixed position along the Z axis.

2. Apparatus according to claim 1 wherein said tool carriage further includes means for selectively rotating said gripper about said gripper axis.

3. Apparatus according to claims 1 or 2 wherein said linkage means includes:

a first bar member extending between said tool carrier means and a first point, said first point being located on said tool moving means, said first bar member being pivotally coupled to said tool moving means at said first point and being slidingly coupled to a first support member, said first support member being pivotally coupled to a portion of said machine tool at a second point, said second point being fixed along said Z axis, a second bar member extending between said tool carrier means and a third point, said third point being located on said tool moving means, said second bar member being pivotally coupled to said tool moving means at said third point and being slidingly coupled to a second support member, said second support member being pivotally coupled to said portion of said machine tool at a fourth point, said fourth point being fixed along said Z axis, wherein said first and third points are equidistant from said Z axis, and wherein said second and fourth points are equidistant from said Z axis, and wherein said linkage means further includes limit means for maintaining the distance between said first and second points equal to the distance between said third and fourth points.

4. Apparatus according to claim 3 wherein said limit means comprises:

a first rack member coupled to said first support member and including means for maintaining at least a portion of said first rack member substantially parallel to said first bar member between said tool carrier means and a first carriage point located on said tool carriage, said first rack member being pivotally coupled to said carriage at said first carriage point, a first gear pivotally coupled at an associated point fixed along said Z axis and adapted to engage said first rack member, a second rack member coupled to said second support member and including means for maintaining at least a portion of said second rack member substantially parallel to said second bar member between said tool carrier means and a second carriage point located on said tool carriage, said second rack member being pivotally coupled to said carriage at said second carriage point, a second gear pivotally coupled at an associated point fixed along said Z axis and adapted to engage said second rack member, coupling means for coupling said first and second gears, whereby the distance between said first and second points equals the distance between said third and fourth points.

5. Apparatus according to claim 4 wherein said magazine axis is parallel to said Z axis.

6. Apparatus according to claim 1 wherein said magazine axis is parallel to said Z axis.

7. Apparatus according to claim 2 wherein said magazine axis is parallel to said Z axis.

8. Apparatus for changing tools for a machine tool, said tools having principle axes, and said machine tool including means for selectively moving one of said tools along a reference (Z) axis relative to a workpiece positioning table with said principle axis being parallel to said Z axis, comprising:

A. a tool magazine including tool carrier means for storing a plurality of said tools, said carrier including a tool loading station wherein one of said tools at said tool loading station has its principle axes substantially parallel to a magazine axis, said tool carrier means being positioned at a fixed position along said Z axis, B. a tool carriage including a gripper means and associated means for selectively translating said gripper means along a gripper axis, said gripper means being selectively operable to grip a tool adjacent thereto with its principle axis parallel to said gripper axis, C. linkage means including means for selectively translating said tool carriage between said tool loading station and said tool moving means whereby said gripper axis is substantially parallel to said Z axis when said tool carriage is adjacent to said tool moving means and whereby said gripper axis is substantially parallel to said magazine axis when said tool carriage is adjacent to said tool loading station, wherein said linkage means includes a variable perimeter parallelogram linkage having two pivot points pivotally coupled to said tool moving means and two pivot points pivotally coupled to said machine tool at a fixed position along the Z axis, wherein said linkage means includes:

a first bar member extending between said tool carrier means and a first point, said first point being located on said tool moving means, said first bar member being pivotally coupled to said tool moving means at said first point and being slidingly coupled to a first support member, said first support member being pivotally coupled to a portion of said machine tool at a second point, said second point being fixed along said Z axis, a second bar member extending between said tool carrier means and a third point, said third point being located on said tool moving means, said second bar member being pivotally coupled to said tool moving means at said third point and being slidingly coupled to a second support member, said second support member being pivotally coupled to said portion of said machine tool at a fourth point, said fourth point being fixed along said Z axis, wherein said first and third points are equidistant from said Z axis, and wherein said second and fourth points are equidistant from said Z axis, and wherein said linkage means further includes limit means for maintaining the distance between said first and second points equal to the distance between said third and fourth points, wherein said limit means comprises:

a first rack member coupled to said first support member and including means for maintaining at least a portion of said first rack member substantially parallel to said first bar member between said tool carrier means and a first carriage point located on said tool carriage, said first rack member being pivotally coupled to said carriage at said first carriage point, a first gear pivotally coupled at an associated point fixed along said Z axis and adapted to engage said first rack member, a second rack member coupled to said second support member and including means for maintaining at least a portion of said second rack member substantially parallel to said second bar member between said tool carrier means and a second carriage point located on said tool carriage, said second rack member being pivotally coupled to said carriage at said second carriage point, a second gear pivotally coupled at an associated point fixed along said Z axis and adapted to engage said second rack member, coupling means for coupling said first and second gears, whereby the distance between said first and second points equals the distance between said third and fourth points.

9. Apparatus according to claim 8 wherein said magazine axis is parallel to said Z axis.

* * * * *